(12) United States Patent
Myer et al.

(10) Patent No.: US 6,532,319 B2
(45) Date of Patent: Mar. 11, 2003

(54) CERAMIC SUBSTRATE FOR PHOTONIC SWITCHING SYSTEM

(75) Inventors: Paul Charles Myer, San Jose; Gary Trott, San Mateo, both of CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 181 days.

(21) Appl. No.: 09/741,617

(22) Filed: Dec. 18, 2000

(65) Prior Publication Data

US 2002/0076135 A1 Jun. 20, 2002

(51) Int. Cl.$^7$ ................................................. G02B 6/35
(52) U.S. Cl. ............................... 385/17; 385/16; 385/18
(58) Field of Search .............................. 385/16, 17, 18, 385/15, 19, 20, 21, 23

(56) References Cited

U.S. PATENT DOCUMENTS

| | | | | |
|---|---|---|---|---|
| 4,988,157 A | * | 1/1991 | Jackel et al. ................... | 385/17 |
| 5,204,921 A | * | 4/1993 | Kanai et al. ................... | 385/17 |
| 5,210,801 A | * | 5/1993 | Fournier et al. ............... | 385/129 |
| 5,699,462 A | | 12/1997 | Fouquet et al. ................ | 385/16 |
| 6,055,344 A | * | 4/2000 | Fouquet et al. ................ | 385/16 |
| 6,072,924 A | * | 6/2000 | Sato et al. ..................... | 385/16 |
| 6,188,815 B1 | * | 2/2001 | Schiaffino et al. ............. | 385/16 |
| 6,195,478 B1 | * | 2/2001 | Fouquet ......................... | 385/16 |
| 6,360,775 B1 | * | 3/2002 | Barth et al. .................... | 137/803 |

* cited by examiner

Primary Examiner—Rodney Bovernick
Assistant Examiner—Sung Pak

(57) ABSTRACT

An optical cross-connect switch and manufacturing method therefor is provided which includes a planar lightwave circuit having a number of optical waveguides and trenches. The planar lightwave circuit has a first waveguide and a second waveguide that intersect the trench such that optical coupling between the first and second waveguides is dependent upon a presence of a fluid at an intersection of the trench with the first and second waveguides. A mounting base, having a channel and through openings provided therein, has fill tubes disposed in the groove and through openings of the mounting base. A reservoir pedestal having through openings provided therein and bonded to the reservoir pedestal with the fill tubes extending through the through openings therein to form a reservoir substrate. A bubble-forming element is disposed on a first surface of the reservoir pedestal, including patterning a plurality of leads on the first surface and a sealing/bonding ring bonds and seals the planar lightwave circuit and the reservoir substrate to form a reservoir having the bubble-forming element and planar lightwave circuit aligned such that the reservoir is in fluid communication with the fill tubes through the reservoir substrate and the trench in the planar lightwave circuit which is in thermal communication with the bubble-forming element on the first surface of the reservoir pedestal.

20 Claims, 3 Drawing Sheets

CERAMIC SUBSTRATE FOR PHOTONIC SWITCHING SYSTEM

TECHNICAL FIELD

The invention relates generally to optical switching elements and more particularly to components in switches in which optical coupling among waveguides is determined by manipulating fluid.

BACKGROUND ART

In the past, telecommunications and data communications networks have traditionally relied on electrical signals transmitted electrically on conductive lines. As higher and higher data exchange rates are required, conductive lines are no longer sufficient and increasingly the data is transmitted through the use of optical signals through optical fibers. Equipment for efficiently generating and transmitting the optical signals has been designed and implemented, but the manufacturability of optical switches for use in telecommunications and data communications networks is problematic.

Fouquet et al. (U.S. Pat. No. 5,699,462), which is assigned to the assignee of the present invention, describes a switching matrix that is used for routing optical signals from any one of a number of parallel input optical fibers to any one of a number of parallel output optical fibers.

Referring now to FIG. 1 (PRIOR ART), therein is shown an isolated optical switching element 10 formed on a substrate 12. The substrate 12 is of silicon or silica. The optical switching element 10 includes planar waveguides defined by a lower cladding layer 14, a core 16 and an upper cladding layer 18. The core 16 is primarily silicon dioxide, but other materials that affect the index of refraction of the core may be used. The cladding layers 14 and 18 are formed of a material having a refractive index that is substantially different from the refractive index of the core material, so that optical signals are guided along the core material.

In the manufacturing process, the core 16 is patterned to define an input waveguide 20 and an output waveguide 26 of a first waveguide path and to define an input waveguide 24 and an output waveguide 22 of a second waveguide path. The upper cladding layer 18 is then deposited over the core 16. A trench 28 is etched through the core 16 at the intersection of the first and second waveguide paths and the two cladding layers 14 and 18 to the substrate 12. The waveguide paths intersect the trench 28 at an angle of incidence greater than the critical angle of total internal reflection (TIR) when the trench 28, which is filled with a fluid having a refractive index that closely matches the refractive index of the waveguides, contains a bubble.

Thus, TIR diverts light from the input waveguide 20 to the output waveguide 22, unless an index-matching fluid is located within the gap between the aligned waveguides 20 and 26. The trench 28 is positioned with respect to the four waveguides 20, 26, 24, and 22 such that one sidewall of the trench 28 passes through or is slightly offset from the intersection of the axes of the waveguide paths.

Referring now to FIG. 2 (PRIOR ART), therein is shown a plurality of the optical switching elements 10 in a 4 times 4 matrix 32. In the 4 times 4 matrix 32, any one of four input waveguides 34, 36, 38 and 40 may be optically coupled to any one of four output waveguides 42, 44, 46, and 48. The switching arrangement is referred to as "non-blocking," since any free input waveguide can be connected to any free output waveguide regardless of which connections have already been made through the switching arrangement. Each of the sixteen optical switches has a trench that causes TIR in the absence of an index-matching liquid at the gap between collinear waveguides, but collinear waveguides of a particular waveguide path are optically coupled when the gaps between the collinear waveguides are filled with the refractive index-matching fluid. Trenches in which the waveguide gaps are filled with fluid are represented by fine lines that extend at an angle through the intersections of optical waveguides in the array. On the other hand, trenches in which the index-matching fluid is absent at the gaps are represented by broad lines through a point of intersection.

For example, the input waveguide 20 of FIGS. 1 and 2 (PRIOR ART) is in optical communication with the output waveguide 22, as a result of reflection at the empty gap of the trench 28. Since all other cross points for allowing the input waveguide 34 to communicate with the output waveguide 44 are in a transmissive state, a signal that is generated at the input waveguide 34 will be received at output waveguide 44. In like manner, the input waveguide 36 is optically coupled to the first output waveguide 42, the third input waveguide 38 is optically coupled to the fourth output waveguide 48, and the fourth input waveguide 40 is coupled to the third output waveguide 46.

There are a number of available techniques for changing an optical switch of the type shown in FIG. 1 from a transmissive state to a reflective state and back to the transmissive state. One method of changing states involves forming and eliminating the gap by forming and removing bubbles in a refractive index-matching liquid. A plurality of heating elements are used where the application of heat to a trench forms the bubble and the removal of the heat causes the bubble to collapse. The heating elements are activated by external signals on leads on a reservoir substrate.

Essentially, the refractive index-matching liquid resides within the trench in the waveguide paths until a bubble is formed to create an index mismatch and cause light to be reflected at the sidewall of a trench. Collapsing the bubble returns the switch to the transmissive state. The refractive index-matching liquid is supplied through reservoirs above and below the waveguide paths and is resupplied from outside of the 4 times 4 matrix 32 through the substrate 12.

The passages for filling the matrix with the refractive index-matching liquid are located in the reservoir substrate and require machined right angle passages which are extremely difficult to manufacture resulting in high manufacturing costs.

Further, thermal expansion mismatch has been a problem which leads to bowing of the waveguides and also the loss of the hermetic sealing to the bottom reservoir.

Even further, it has been determined that the relatively low thermal conductivity of the current substrate materials slows the operation of the optical switching elements because heat is retained and the bubble does not collapse quickly.

These problems are becoming bottlenecks in the development of the optical switch and the solutions to these problems have eluded those skilled in the art.

DISCLOSURE OF THE INVENTION

The present invention provides an optical cross-connect switch which includes a planar lightwave circuit having a number of optical waveguides and trenches. The planar lightwave circuit has a first waveguide and a second waveguide that intersect the trench such that optical coupling between the first and second waveguides is dependent upon a presence of a fluid at an intersection of the trench with the first and second waveguides. A mounting base, having a channel and through openings provided therein, has fill tubes disposed in the groove and through openings of the mounting base. A reservoir pedestal having through openings provided therein and bonded to the reservoir pedestal with the fill tubes extending through the through openings therein to form a reservoir substrate. A bubble-forming element is disposed on a first surface of the reservoir pedestal, including patterning a plurality of leads on the first surface and a sealing/bonding ring bonds and seals the planar lightwave circuit and the reservoir substrate to form a reservoir having the bubble-forming element and planar lightwave circuit aligned such that the reservoir is in fluid communication with the fill tubes through the reservoir substrate and the trench in the planar lightwave circuit which is in thermal communication with the bubble-forming element on the first surface of the reservoir pedestal. The optical cross-connect switch is easily and inexpensively formed, and further is not subject to thermal conductivity mismatch or low thermal conductivity problems.

The present invention further provides a method of fabricating an optical cross-connect switch which includes providing a planar lightwave circuit having a plurality of optical waveguides and a trench provided therein. The planar lightwave circuit includes a first waveguide and a second waveguide that intersect the trench such that optical coupling between the first and second waveguides is dependent upon a presence of a fluid at an intersection of the trench with the first and second waveguides. A mounting base having a channel and through openings provided therein is provided with fill tubes disposed in the groove and through openings of the mounting base. A reservoir pedestal having through openings provided therein is provided and bonded to the mounting base with the fill tubes extending through the through openings therein to form a reservoir substrate. A bubble-forming element is formed on a first surface of the reservoir pedestal, including patterning of a plurality of leads on the first surface. A sealing/bonding ring is provided and used to bond and seal the planar lightwave circuit and the reservoir substrate to form a reservoir. The bubble-forming element and planar lightwave circuit are aligned such that the reservoir is in fluid communication with the fill tubes through the reservoir substrate and the trench in the planar lightwave circuit is in thermal communication with the bubble-forming element on the first surface of the reservoir pedestal. The optical cross-connect switch is easily and inexpensively formed, and further is not subject to thermal conductivity mismatch or low thermal conductivity problems.

The above and additional advantages of the present invention will become apparent to those skilled in the art from a reading of the following detailed description when taken in conjunction with the accompanying drawings.

BEST MODE FOR CARRYING OUT THE INVENTION

Figure 3:
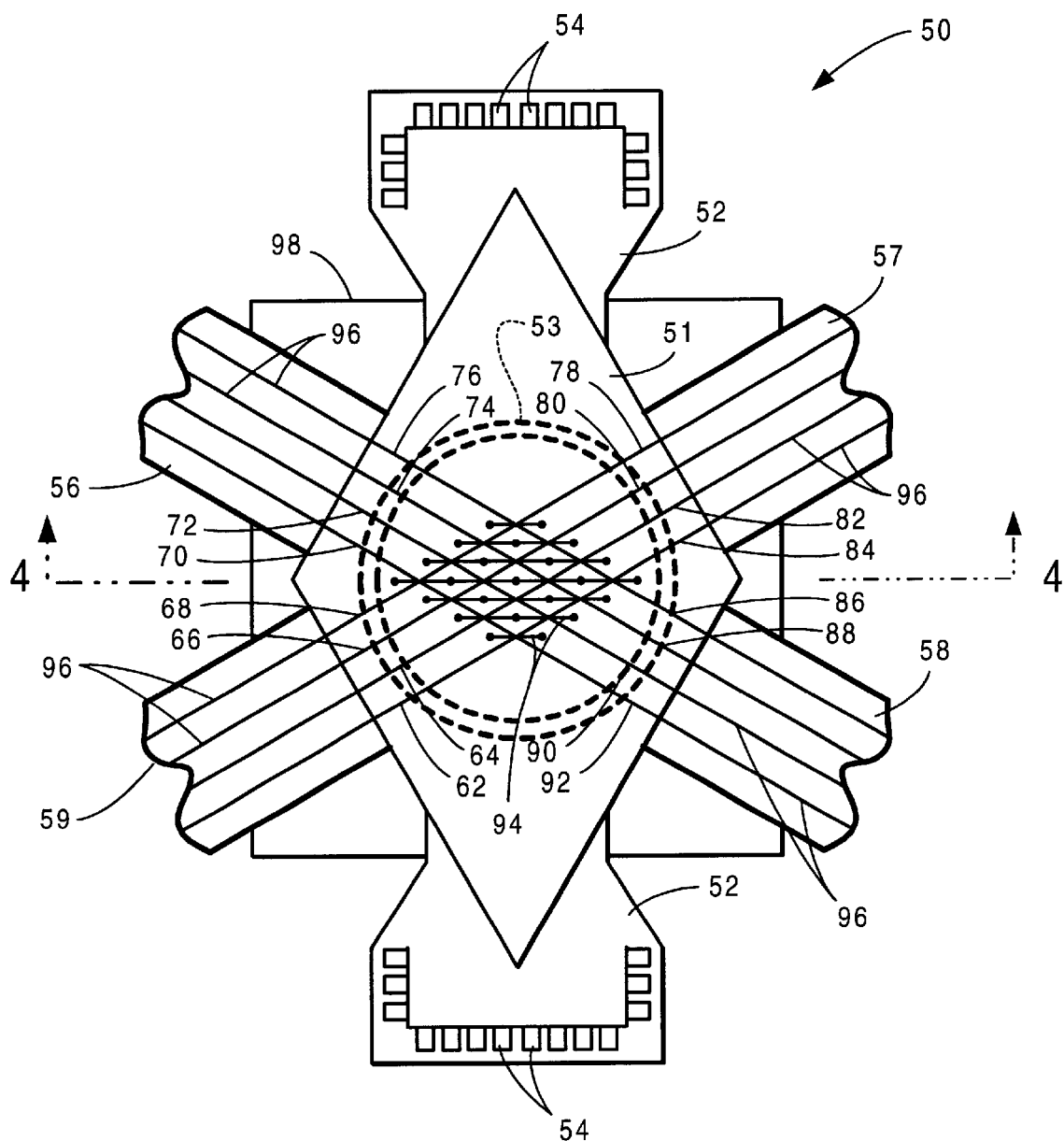
FIG. 3 is a top view of a cross-connect switch having optical paths that intersect trenches that are supplied with fluid in a structure manufactured in accordance with the present invention.

Referring now to FIG. 3, therein is shown a top view of a cross-connect switch 50 having a planar lightwave circuit (PLC) 51, which is shown atop a reservoir substrate 52. The reservoir substrate 52 is spaced apart from the PLC 51 by a sealing/bonding ring 53 to form a reservoir for a refractive index-matching liquid as will later be explained. The reservoir substrate 52 also supports bubble-forming elements, such as heaters (not shown), which are attached by patterned electrical leads to bond pads 54 at the edges of the reservoir substrate 52. The bond pads 54 are then connected to bubble forming circuitry (not shown) for operating the bubble-forming elements. As will be explained fully below, fluid fill tubes are placed within the PLC 51 to supply the refractive index-matching fluid from the reservoir formed by the PLC 51, the reservoir substrate 52, and the sealing ring 53 to trenches in the PLC 51.

The PLC 51 has a four-sided configuration and one of four fiber array substrates 56, 57, 58 and 59 are attached to each side. Each of the four fiber array substrates 56, 57, 58 and 59 is fabricated to extend perpendicularly from an edge of the PLC 51 and each optical switching element will be substantially identical to the switching element 10 shown in FIG. 1. However, in one embodiment, the angles of incidence of the waveguide on the trench are in the range of 45° to 60°.

In one embodiment, the PLC 51 has sixteen input/output waveguides 62, 64, 66, 68, 70, 72, 74, 76, 78, 80, 82, 84, 86, 88, 90 and 92 (62–68, 70–84, and 86–92). Typically, the operations of the switching matrix that are of greatest concern are the operations that determine the optical coupling of the waveguides 62–68 with the waveguides 86–92. The remaining waveguides 70–84 may be used for add and drop operations or to connect to other switches to form a larger scale switching matrix.

Each of the waveguides 62–92 is formed of a core material, such as $SiO_2$ that is doped with Ge or $TiO_2$, to define a first refractive index. Cladding material may be primarily $SiO_2$, but with a different dopant, such as $B_2O_3$ and/or $P_2O_5$, to define a second refractive index different from the first refractive index. Because of the difference in refractive indices, optical signals are guided along the waveguide cores.

Each of the fiber array substrates 56, 57, 58 and 59 includes a plurality of optical fibers, for example, four optical fibers 96. The pitch of the fibers matches the pitch of the input/output waveguides on the PLC 51. An acceptable pitch is approximately 250 $\mu$m, but other center-to-center distances may be utilized, such as 500 $\mu$m. Ideally, the waveguides have the same cross sectional geometry as the optical fibers. However, it is not feasible to fabricate fiber array substrate waveguides having a circular cross section. Moreover, the 8 $\mu$m dimension of a conventional fiber is not necessarily optimal for waveguides for which optical signals must propagate through fluid-filled trenches in order to pass from one waveguide to a substantially collinear waveguide. It has been determined that transmission losses across fluid-filled gaps are reduced by increasing the cross sectional area of the waveguides. Thus, the waveguides 62–92 may be adiabatically tapered from a relatively large cross sectional area at the interior ends at the trenches 94 to a smaller cross sectional area at the interface with the optical fibers 96. The cross sectional geometry at the interior end is selected to achieve efficient optical coupling across the trenches, while the cross sectional geometry at the exterior ends is selected to achieve high coupling efficiency to the optical fibers. In one embodiment, the adiabatic tapering is from a 16 µm times 8 µm cross sectional geometry to an 8 µm square cross-sectional geometry. Alternatively, the adiabatic taper may be incorporated along the optical fibers 96, such as by using a thermally diffused, expanded-core (TEC) fiber. As is known in the art, TEC fibers have an expanding portion at the ends of the fibers.

While not shown in the top view of FIG. 3, the interface between the reservoir substrate 52 and each of the fiber array substrates 56, 57, 58 and 59 can be intentionally tilted at an angle, such as eight degrees. This intentional tilt is intended to decrease the magnitude of reflection between waveguides on the PLC 51 and optical fibers on the fiber array substrates 56, 57, 58 and 59.

Figure 1:
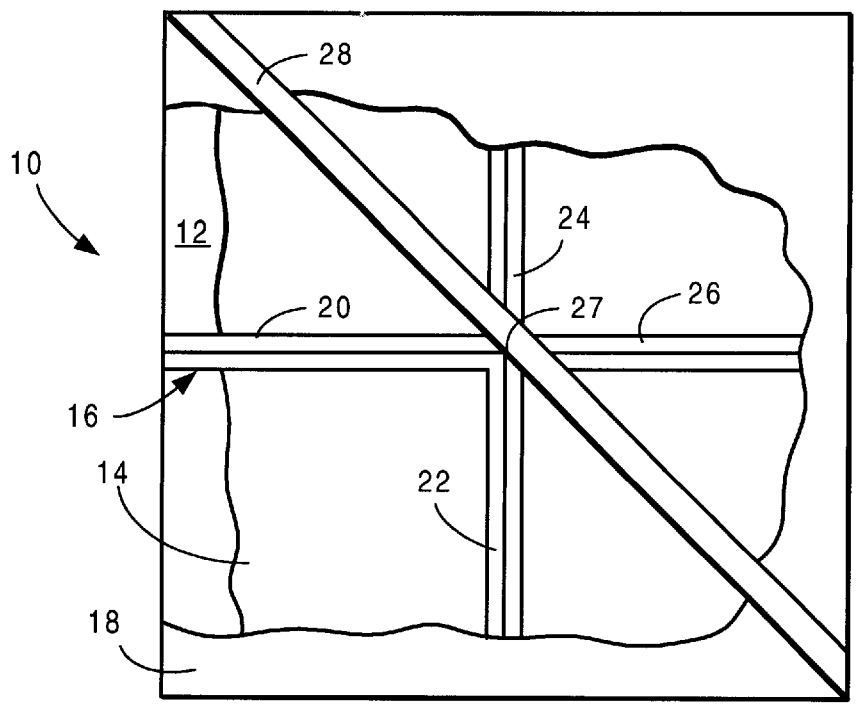
FIG. 1 (PRIOR ART) is a top view of an optical switching element that utilizes total internal reflection in accordance with the prior art.
Figure 2:
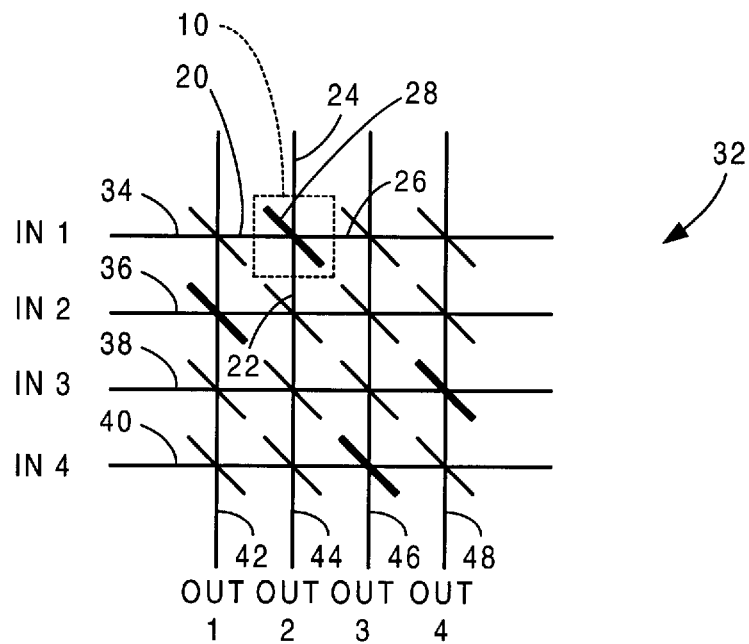
FIG. 2 (PRIOR ART) is a 4 times 4 matrix of switching elements of FIG. 1 to allow connection of any one of a number of input waveguides to any one of a number of output waveguides in accordance with the prior art.

As previously described with reference to FIG. 1, optical coupling among waveguides is dependent upon the presence or absence of the refractive index-matching fluid at the gaps between waveguide ends. If the lowermost trench in FIG. 3 does not include the index-matching fluid at the gap, any signals from the waveguide 62 will be diverted by total internal reflection (TIR) to the waveguide 92. On the other hand, if the gap at the intersection of waveguides 62 and 92 is filled with the refractive index-matching fluid, the optical signal from waveguide 62 will propagate through the trench to the next trench. Depending upon the presence or absence of fluid, the input signal from waveguide 62 may be diverted to any of the four waveguides 86–92 or propagate straight through to waveguide 84. This versatility applies to the other three waveguides 64, 66 and 68 that are adjacent to waveguide 62.

Figure 4:
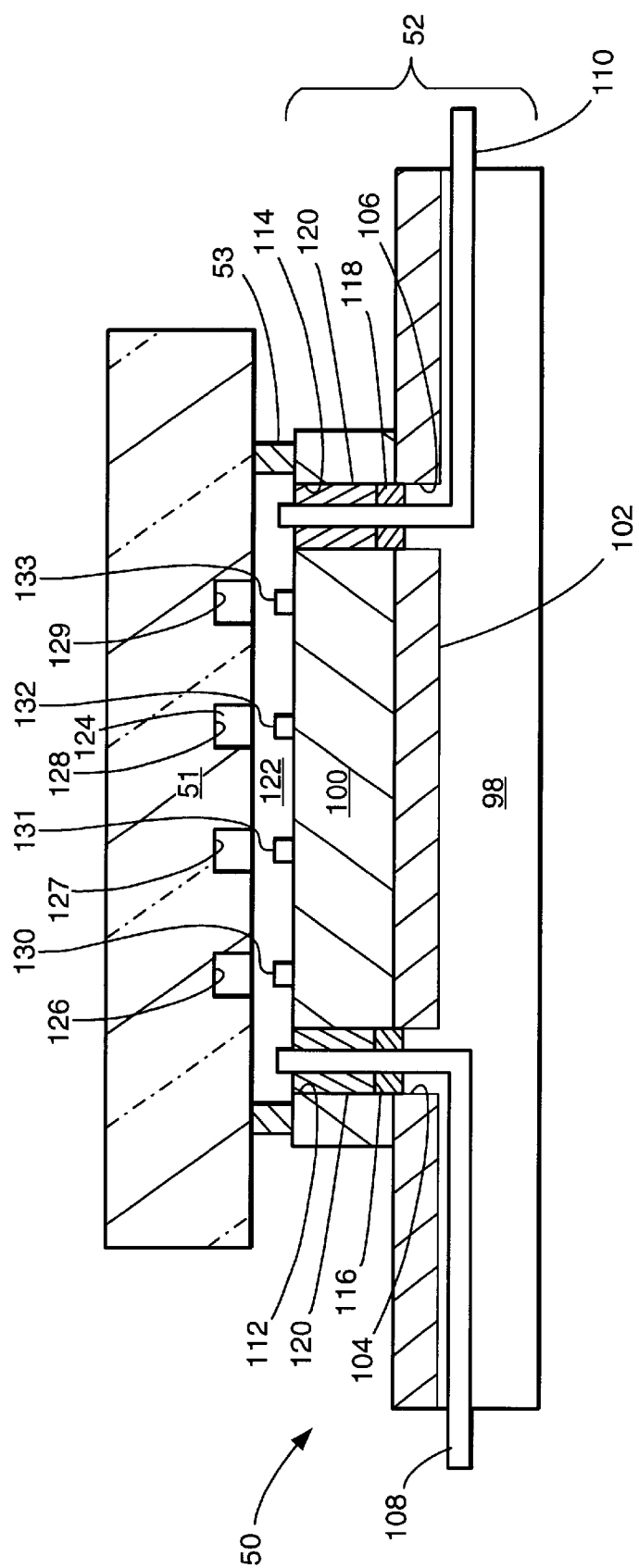
FIG. 4 a cross-sectional view of the cross-connect switch taken along line 4—4 of FIG. 3 of the structure manufactured in accordance with the present invention.

Referring now to FIG. 4, therein is shown a cross-sectional view of the cross-connect switch 50 of the present invention taken along line 4—4 of FIG. 3. The reservoir substrate 52 consists of a mounting base 98 and a reservoir pedestal 100. The mounting base 98 contains a bottom channel 102 and through holes 104 and 106 into which respective right angle fill tubes 108 and 110 have been inserted. The reservoir pedestal 100 has through holes 112 and 114 into which the respective right angle fill tubes 108 and 110 extend.

The mounting base 98 and the reservoir pedestal 100 are bonded into a single unit, the reservoir substrate 52 by brazing foils 116 and 118, which also hold the respective right angle fill tubes 108 and 110 in position. Solder 120 is melted to fill the open space between the through holes 112 and 114 and the respective right angle fill tubes 108 and 110 over the brazing foils 116 and 118, respectively, and to make the top of the reservoir pedestal 100 flat.

The sealing/bonding ring 53 seals and bonds the PLC 51 and the reservoir substrate 52 to form a reservoir 122 containing the refractive index-matching fluid 124, which fills the trenches such as trenches 126, 127, 128, and 129. The refractive index-matching fluid 124 has a refractive index that substantially matches the refractive index of the core material of the waveguides 62–68, 70–84, and 86–92. An acceptable liquid is a combination of isopropyl alcohol and glycerol. Other acceptable liquids are cyclohexane, methylcyclohexane, and M-pyrol.

Fouquet et al. (U.S. Pat. No. 5,699,462), which is assigned to the assignee of the present invention and is incorporated herein, describes a number of alternative approaches to switching a switching element between a transmissive state and a reflective state. For example, for each switching element within the PLC 51, there may be one or more heaters that can be used to manipulate bubbles within the refractive index-matching fluid 124 in order to switch the state of the element. For example, heating elements 130, 131, 132, and 133 on the reservoir pedestal 100 are aligned so as to be in thermal and fluid communication with the respective trenches 126, 127, 128, and 129 in the PLC 51.

In the present invention, the mounting base 98 and the reservoir pedestal 100 are of ceramic materials, such as aluminum nitride (AlN) or silicon carbide (SiC) or boron nitride (BN), to match the co-efficient of thermal expansion of the PLC 51, which is a silicon or silica chip. This has the advantage of maintaining the hermetic seal around the reservoir 122 at the highest level measurable. This level is necessary since the seepage of atmospheric gasses is a major cause of failure of the cross-connect switch 50.

Further, it has been determined that the use of ceramic materials in the reservoir substrate 52 which have thermal conductivities which match the PLC 51 allow rapid removal of heat from the refractive index-matching fluid 124 which in turn speeds up operation of the cross-connect switch 50.

An additional advantage to the use of ceramic materials is that the mounting base 98 and the reservoir pedestal 100 can be molded rather than machined which results in a substantial cost savings in manufacturing.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the spirit and scope of the included claims. All matters hitherto-fore set forth or shown in the accompanying drawings are to be interpreted in an illustrative and non-limiting sense.

The invention claimed is:

1. A method of fabricating an optical cross-connect switch comprising:

providing a planar lightwave circuit having a plurality of optical waveguides and a trench provided therein, including a first waveguide and a second waveguide that intersect the trench such that optical coupling between the first and second waveguides is dependent upon a presence of a fluid at an intersection of the trench with the first and second waveguides;

providing a mounting base having a channel and through openings provided therein;

providing fill tubes disposed in the channel and through openings of the mounting base;

providing a reservoir pedestal having through openings provided therein;

forming a bubble-forming element on a first surface of the reservoir pedestal, including patterning a plurality of leads on the first surface;

bonding the mounting base and reservoir pedestal together with the fill tubes extending through the through openings therein to form a reservoir substrate;

providing a sealing/bonding ring; and bonding and sealing the planar lightwave circuit and the reservoir substrate using the sealing/bonding ring to form a reservoir, including aligning the bubble-forming element and planar lightwave circuit such that the reservoir is in fluid communication with the fill tubes through the reservoir substrate and the trench in the planar lightwave circuit is in thermal communication with the bubble-forming element on the first surface of the reservoir pedestal.

2. The method as claimed in claim 1 wherein the bonding of the mounting base and reservoir pedestal includes brazing the mounting base and reservoir pedestal at the fill tubes.

3. The method as claimed in claim 1 wherein forming the reservoir structure includes filling the through openings in the reservoir pedestal with solder around the fill tubes.

4. The method as claimed in claim 1 wherein providing of the fill tubes provides fill tubes having a first portion extending parallel to the channel in the mounting base and a second portion extending at right angles to the first portion to extend into the through opening in the mounting base.

5. The method as claimed in claim 1 wherein providing the mounting base and the reservoir pedestal includes forming the mounting base and the reservoir pedestal from a ceramic material.

6. A method of fabricating an optical cross-connect switch comprising:

providing a planar lightwave circuit having a plurality of optical waveguides and a trench provided therein, including a first waveguide and a second waveguide that intersect the trench such that optical coupling between the first and second waveguides is dependent upon a presence of a fluid at an intersection of the trench with the first and second waveguides;

providing a mounting base having a channel and through openings provided therein;

providing fill tubes disposed in the channel and sealed in the through openings of the mounting base;

providing a reservoir pedestal having through openings provided therein;

forming a bubble-forming element on a first surface of the reservoir pedestal, including patterning a plurality of leads on the first surface connecting the bubble-forming element to a plurality of pads;

bonding the mounting base and reservoir pedestal together proximate the fill tubes with the fill tubes extending through the through openings therein to form a reservoir substrate;

providing a sealing/bonding ring encircling the fill tubes on the first surface of the reservoir pedestal; and bonding and sealing the planar lightwave circuit and the reservoir substrate using the sealing/bonding ring to form a reservoir, including aligning the bubble-forming element and planar lightwave circuit such that the reservoir is in fluid communication with the fill tubes through the reservoir substrate and the trench in the planar lightwave circuit is in thermal and fluid communication with the bubble-forming element on the first surface of the reservoir pedestal.

7. The method as claimed in claim 6 wherein the bonding of the mounting base and reservoir pedestal includes brazing the mounting base and reservoir pedestal in the through openings of the mounting base and reservoir pedestal at the fill tubes.

8. The method as claimed in claim 6 including filling the through openings with solder around the fill tubes to make the first surface of the reservoir pedestal planar.

9. The method as claimed in claim 6 wherein providing of the fill tubes provides fill tubes having a first portion extending parallel to the channel in the mounting base and a second portion extending at right angles to the first portion to extend into the through opening in the mounting base and the reservoir pedestal.

10. The method as claimed in claim 6 wherein providing the mounting base and the reservoir pedestal includes forming the mounting base and the reservoir pedestal from a ceramic material selected from a group consisting of aluminum, silicon, boron, a nitride thereof, a carbide thereof, and a combination thereof.

11. An optical cross-connect switch comprising:

a planar lightwave circuit having a plurality of optical waveguides and a trench provided therein, including a first waveguide and a second waveguide that intersect the trench such that optical coupling between the first and second waveguides is dependent upon a presence of a fluid at an intersection of the trench with the first and second waveguides;

a mounting base having a channel and through openings provided therein;

fill tubes disposed in the channel and through openings of the mounting base;

a reservoir pedestal having through openings provided therein and bonded to the Mounting Base with the fill tubes extending through the through openings therein to form a reservoir substrate;

a bubble-forming element on a first surface of the reservoir pedestal, including patterning a plurality of leads on the first surface; and a sealing/bonding ring bonding and sealing the planar lightwave circuit and the reservoir substrate to form a reservoir having the bubble-forming element and planar lightwave circuit aligned such that the reservoir is in fluid communication with the fill tubes through the reservoir substrate and the trench in the planar lightwave circuit is in thermal communication with the bubble-forming element on the first surface of the reservoir pedestal.

12. The optical cross-connect switch as claimed in claim 11 wherein the mounting base and reservoir pedestal are brazed together at the fill tubes.

13. The optical cross-connect switch as claimed in claim 11 wherein the reservoir structure includes solder filling the through openings in the reservoir pedestal around the fill tubes.

14. The optical cross-connect switch as claimed in claim 11 wherein the fill tubes have a first portion extending parallel to the channel in the mounting base and a second portion extending at right angles to the first portion to extend through the through opening in the mounting base.

15. The optical cross-connect switch as claimed in claim 11 wherein the mounting base and the reservoir pedestal are of a ceramic material.

16. An optical cross-connect switch comprising:

a planar lightwave circuit having a plurality of optical waveguides and a trench provided therein, including a first waveguide and a second waveguide that intersect the trench such that optical coupling between the first and second waveguides is dependent upon a presence of a fluid at an intersection of the trench with the first and second waveguides;

a mounting base having a channel and through openings provided therein;

fill tubes disposed in the channel and sealed in the through openings of the mounting base;

a reservoir pedestal having through openings provided therein and bonded to the mounting base proximate the fill tubes with the fill tubes extending through the through openings therein to form a reservoir substrate;

a bubble-forming element on a first surface of the reservoir pedestal, including patterning a plurality of leads on the first surface connecting the bubble-forming element to a plurality of pads; and a sealing/bonding ring encircling the fill tubes on the first surface of the reservoir pedestal and bonding and sealing the planar lightwave circuit and the reservoir substrate to form a reservoir having the bubble-forming element and planar lightwave circuit aligned such that the reservoir is in fluid communication with the fill tubes through the reservoir substrate and the trench in the planar lightwave circuit is in thermal and fluid communication with the bubble-forming element on the first surface of the reservoir pedestal.

17. The optical cross-connect switch as claimed in claim 16 wherein the mounting base and reservoir pedestal are brazed together in the through openings of the mounting base and reservoir pedestal at the fill tubes.

18. The optical cross-connect switch as claimed in claim 16 wherein the reservoir structure includes solder in the through openings around the fill tubes to make the first surface of the reservoir pedestal planar.

19. The optical cross-connect switch as claimed in claim 16 wherein the fill tubes have a first portion extending parallel to the channel in the mounting base and a second portion extending at right angles to the first portion to extend through the through openings in the mounting base and the reservoir pedestal.

20. The optical cross-connect switch as claimed in claim 16 wherein the mounting base and the reservoir pedestal are formed from a ceramic material selected from a group consisting of aluminum, silicon, boron, a nitride thereof, a carbide thereof, and a combination thereof.

* * * * *